(12) United States Patent
Modzelewski

(10) Patent No.: US 9,037,762 B2
(45) Date of Patent: May 19, 2015

(54) BALANCING DATA DISTRIBUTION IN A FAULT-TOLERANT STORAGE SYSTEM BASED ON THE MOVEMENTS OF THE REPLICATED COPIES OF DATA

(71) Applicant: Dropbox, Inc., San Francisco, CA (US)

(72) Inventor: Kevin P. Modzelewski, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 66 days.

(21) Appl. No.: 13/955,734

(22) Filed: Jul. 31, 2013

(65) Prior Publication Data

US 2015/0039847 A1 Feb. 5, 2015

(51) Int. Cl.
*G06F 15/16* (2006.01)
*G06F 3/06* (2006.01)
*G06F 11/20* (2006.01)

(52) U.S. Cl.
CPC .............. *G06F 3/065* (2013.01); *G06F 3/0604* (2013.01); *G06F 3/067* (2013.01); *G06F 11/2058* (2013.01)

(58) Field of Classification Search
CPC .................................................. G06F 11/2058
USPC ................................ 710/62–64; 711/112–114
See application file for complete search history.

(56) References Cited

U.S. PATENT DOCUMENTS

| | | | | |
|---|---|---|---|---|
| 7,778,183 B2 * | 8/2010 | Fan et al. | ....................... | 370/238 |
| 8,880,838 B2 * | 11/2014 | Kaiser et al. | ................... | 711/170 |
| 8,886,602 B2 * | 11/2014 | Zunger et al. | ................. | 707/626 |
| 2005/0120057 A1 | 6/2005 | Hashimoto | | |
| 2005/0283487 A1 | 12/2005 | Karlsson | | |
| 2010/0274762 A1 | 10/2010 | Murphy | | |
| 2010/0299447 A1 * | 11/2010 | Salvi et al. | .................... | 709/233 |
| 2012/0124285 A1 | 5/2012 | Soran | | |

OTHER PUBLICATIONS

Karlsson and Karamanolis, "Bounds on the Replication Cost for QoS" Technical report HPL-2003-156, Hewlett Packard Labs, Jul. 2003.*

* cited by examiner

*Primary Examiner* — Tammara Peyton
(74) *Attorney, Agent, or Firm* — Park, Vaughan, Fleming & Dowler LLP

(57) ABSTRACT

The disclosed embodiments relate to a system for managing replicated copies of data items in a storage system. During operation, the system obtains a current configuration of the storage system, wherein the current configuration specifies locations of replicated copies of data items. Next, the system analyzes the current configuration to identify possible movements of copies of data items among locations in the storage system. The system then assigns utilities to the identified movements, wherein a utility assigned to a movement reflects a change in reliability resulting from the movement. Finally, the system selects a utility-maximizing set of movements and performs the utility-maximizing set of movements to improve the reliability of the storage system.

21 Claims, 5 Drawing Sheets

| DATA BLOCK ID 421 | SIZE 422 | DRIVE ID 423 | DRIVE ID 424 | DRIVE ID 425 | GENERATION NUMBER 426 |

DATA BLOCK RECORD 420

BALANCING DATA DISTRIBUTION IN A FAULT-TOLERANT STORAGE SYSTEM BASED ON THE MOVEMENTS OF THE REPLICATED COPIES OF DATA

BACKGROUND

1. Field

The disclosed embodiments generally relate to data storage systems that maintain replicated copies of data items for fault-tolerance purposes. More specifically, the disclosed embodiments relate to the design of a data storage system that automatically moves replicated copies of data items to various locations in the data storage system to improve fault tolerance.

2. Related Art

Organizations such as airlines and banks typically store large volumes of data in large storage systems containing hundreds (or even thousands) of computer systems and disk drives. Some of these storage systems include multiple data centers situated at different geographic locations to facilitate communication with geographically distributed client systems and to provide a measure of fault tolerance. Such data storage systems are typically organized hierarchically. For example, an exemplary storage system can include multiple data centers, wherein the machines within each data center are organized into rows, wherein each row includes a number of racks, wherein each rack contains multiple servers, and wherein each server is attached to multiple disk drives that store the data.

To store the data reliably, such data storage systems often create multiple copies of data items and then store each copy at a different location. In this way, a failure at any one location will not result in the loss of a data item. Moreover, the farther the system locates copies of a data item from each other, the more reliable the system becomes because failures become less correlated. For example, if the system locates all copies of a data item on the same disk drive, a failure of the disk drive will cause a loss of all copies of the data item. On the other hand, if the copies are located on different disk drives but are part of the same server, a kernel bug or a power supply problem can take out the entire server. Similarly, a failure in a switch can take out an entire rack, a failure in a power distribution unit can cause an entire row to go down, or a networking problem can cause an entire data center to go offline.

However, the advantages of locating copies of a data item farther away from each other need to be balanced against the fact that moving the copies farther away from each other can be more expensive in terms of bandwidth. For example, bandwidth between data centers is typically more expensive than bandwidth within a data center, and the bandwidth between racks is typically more expensive than the bandwidth within a rack. At present, a designer of a storage system typically analyzes the requirements of the storage system and makes judgment calls about how this tradeoff should be made. However, this approach does not work well as the load on the storage system and the storage system's structure evolve over time. For example, bandwidth can become more expensive as the system becomes more heavily loaded, which can make it more advantageous to locate copies of a data item closer to each other. Also, copies of a data item may need to be relocated when a system component fails.

Hence, what is needed is a system that manages the locations of copies of data items in a manner that can adapt to changing loads and system configurations.

SUMMARY

The disclosed embodiments relate to a system for managing replicated copies of data items in a storage system. During operation, the system obtains a current configuration of the storage system, wherein the current configuration specifies locations of replicated copies of data items. Next, the system analyzes the current configuration to identify possible movements of copies of data items among locations in the storage system. The system then assigns utilities to the identified movements, wherein a utility assigned to a movement reflects a change in reliability resulting from the movement. Finally, the system selects a utility-maximizing set of movements and performs the utility-maximizing set of movements to improve the reliability of the storage system.

In some embodiments, while assigning a utility to a movement, the system computes a utility function for the movement, wherein the utility function includes: a distribution component indicating how the movement affects a distribution of copies of a data item in the storage system; and a replication component indicating how the movement affects a desired number of copies of the data item in the storage system.

In some embodiments, selecting a utility-maximizing set of movements involves considering bandwidth constraints associated with a structure of the storage system.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Before we describe details of the above-described storage system, we first describe the structure of an exemplary online content-management system 120, which includes such a storage system and which operates within a content-management environment 105.

Content-Management Environment

Figure 1:
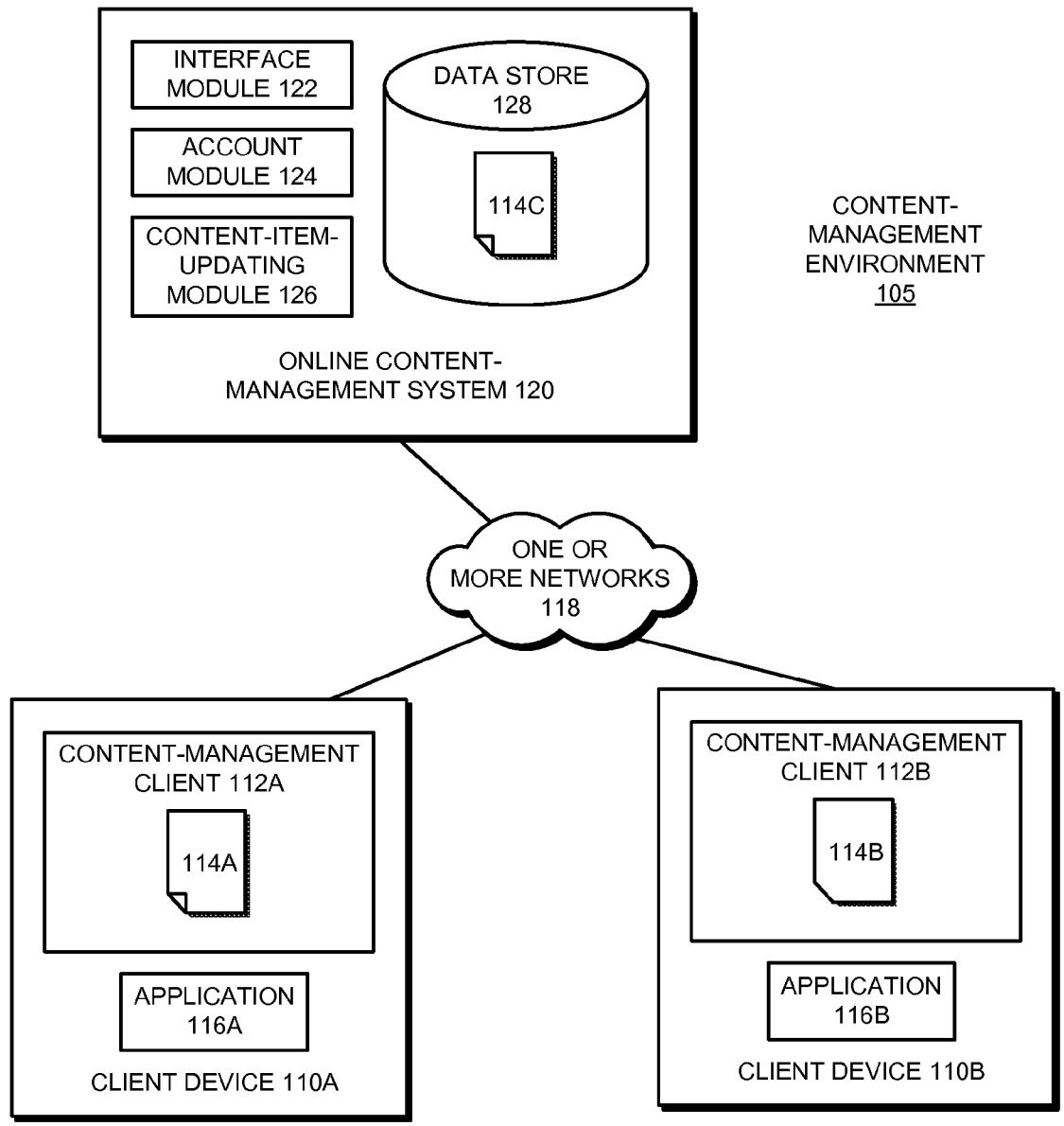
FIG. 1 illustrates a content-management environment in accordance with the disclosed embodiments.

FIG. 1 illustrates content-management environment 105 according to various embodiments. As may be understood from this figure, content-management environment 105 includes a plurality of client devices 110A and 110B (collectively 110) and an online content-management system 120 that are interconnected by one or more networks 118. Various aspects of the client devices 110 and online content-management system 120 are discussed below.

Client Devices

In various embodiments, each client device 110 may selectively execute a content-management client application 112A and 112B (collectively 112) (also referred to as a "content-management client") that may be used to access content items stored within online content-management system 120. In some embodiments, synchronized copies of a content item 114A, 114B and 114C are maintained on client devices 110A and 110B and within online content-management system 120, respectively. (Note that a "content item" can include a file, a folder, a set of folders, or any other type of data object.) In some embodiments, client devices 110 may provide a file-browser type interface (not shown) for directly manipulating the content items stored on online content-management system 120 without maintaining a local copy. Client devices 110 may also include applications 116A and 116B (collectively 116) that manipulate copies of content items 114A and 114B.

While only two client devices 110A and 110B are shown in FIG. 1 for purposes of clarity, it should be understood by those skilled in the art that many client devices 110 may simultaneously connect through network(s) 118 to online content-management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synced copy of one or more content items from within online content-management system 120, and the content items may be stored in any suitable format. When content-management client 112 presents content items that are stored within the online content-management system 120 to a user, the content items may be arranged in folders and the folders themselves may be arranged in other folders, or in any other arbitrary arrangement supported by online content-management system 120, as determined by the user. However, one of skill in the art should understand in light of this disclosure that each user's content item storage architecture may be considerably different from the next, and in some instances, the content item storage architecture may be implemented to maximize storage and content item retrieval efficiency.

Content-Management System

Online content-management system 120 stores content items and manages access to those content items via client devices 110. Online content-management system 120 and its components may be implemented using any appropriate hardware and software that supports file serving, storage, and retrieval functions. For example, online content-management system 120 may be implemented in a single server or multiple servers.

In various embodiments, online content-management system 120 includes interface module 122, account module 124, content-item-updating module 126, and data store 128. Some of the elements of online content-management system 120 are discussed below.

Content-Management System—Interface Module

In particular embodiments, interface module 122 may facilitate content item access and content item storage operations among online content-management system 120 and client devices 110. Interface module 122 may receive content items from and send content items to client devices 110 consistent with the user's preferences for sharing content items. Interface module 122 may also act as the counterpart to a client-side file-explorer style user interface that allows a user to manipulate content items directly stored on online content-management system 120. In some embodiments, software on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via an application 116) and allow a user to manipulate content items stored within online content-management system 120. In this way, the user can directly manipulate content items stored within online content-management system 120.

Content-Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114C is maintained in data store 128 of online content-management system 120. In the embodiment illustrated in FIG. 1, content items 114A, 114B and 114C are local versions of the same shared document that reside on client devices 110A, 110B and online content-management system 120, respectively. Note that client devices 110A and 110B may also store other content items that are replicated on online content-management system 120, but are not shared with other client devices.

In various embodiments, data store 128 may maintain information identifying the user, information describing the user's file directory, and other information in a file journal that is maintained for each user. In some embodiments, the file journal may be maintained on online content-management system 120, and in other embodiments, a file journal (e.g., a "server-side file journal") may be maintained on both online content-management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within online content-management system 120 and the copy of the content item 114B on client device 110B. Similarly, any changes that are made to content item 114C on online content-management system 120 may also be automatically reflected in the copy of content item 114A stored on client device 110A, and the copy of content item 114B stored on client device 110B.

Also, content items 114A and 114B may be stored in local caches within content-management clients 112A and 112B, respectively. Alternatively, content items 114A and 114B may be stored in local file systems within content-management clients 112A and 112B. In some situations, content items 114A and 114B are stored in file system space that is reserved for content-management clients 112A and 112B. In other situations, content items 114A and 114B are stored in normal file system space that is not reserved for content-management clients 112A and 112B.

Content-Management System—Account Module

In particular embodiments, account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on online content-management system 120 may be associated with each of the user's respective client devices. In some embodiments, an application running on each respective client device 110 may help to coordinate synchronization of content items on the client device with corresponding versions of the content items within the user's account in online content-management system 120, and also with corresponding versions of the content items stored on the user's various other client devices.

Content-Management System—Content-Item-Updating Module

In particular embodiments, content-item-updating module 126 is configured to maintain consistency among different copies (versions) of a content item 114A, 114B and 114C that are located in client device 110A, client device 110B and online content-management system 120, respectively. This can be complicated, because the different versions 114A, 114B and 114C of the same shared content items may be simultaneously changed at client devices 110A-B and online content-management system 120. Hence, online content-management system 120 needs to enforce an updating policy to resolve conflicting updates to different versions of the same content item. For example, the copy of the content item 114C on online content-management system 120 can be the master copy of the content item, and updates to the various copies 114A and 114B of the content item can be serialized and applied one-at-a-time to the master copy 114C before being propagated back to the copies 114A and 114B located on client devices 110A and 110B.

Data Centers

Figure 2:
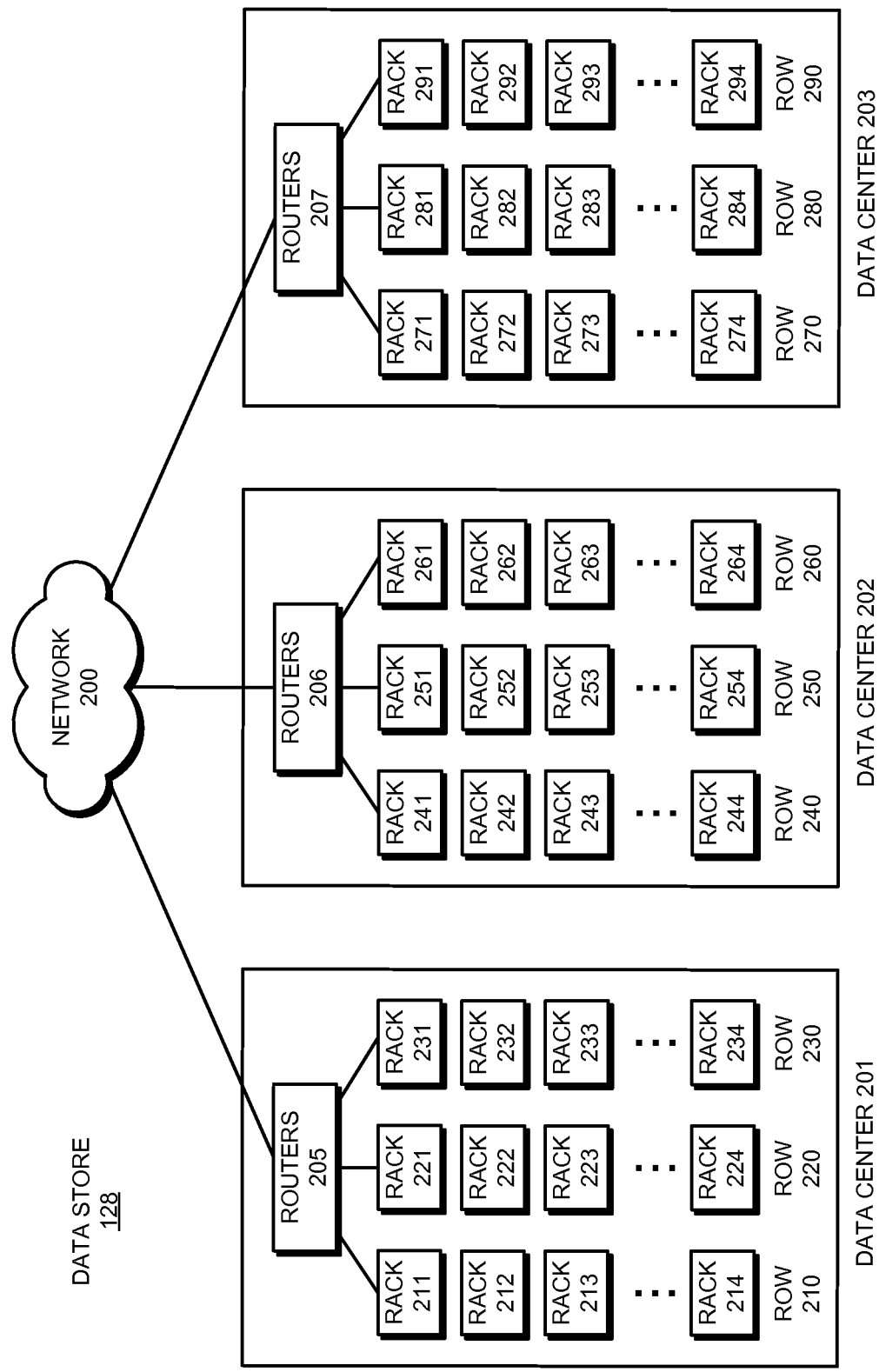
FIG. 2 illustrates a set of data centers in accordance with the disclosed embodiments.

FIG. 2 illustrates an exemplary data store 128 (from FIG. 1) that comprises a set of data centers 201-203 in accordance with the disclosed embodiments. Note that data store 128 can be smaller than the system illustrated in FIG. 2. For example, data store 128 can comprise a single server that is connected to a number of disk drives, a single rack that houses a number of servers, a row of racks, or a single data center with multiple rows of racks. As illustrated in FIG. 2, data store 128 can include a set of geographically distributed data centers 201-203 that may be located in different states, different countries or even on different continents.

Data centers 201-203 are coupled together through a network 200, wherein network 200 can be a private network with dedicated communication links, or a public network, such as the Internet, or a virtual-private network (VPN) that operates over a public network.

Communications to each data center pass through a set of routers that route the communications to specific storage nodes within each data center. More specifically, communications with data center 201 pass through routers 205, communications with data center 202 pass through routers 206, and communications with data center 203 pass through routers 207.

As illustrated in FIG. 2, routers 205-207 channel communications to storage devices within the data centers, wherein the storage devices are incorporated into servers that are housed in racks, wherein the racks are organized into rows within each data center. For example, the racks within data center 201 are organized into rows 210, 220 and 230, wherein row 210 includes racks 211-214, row 220 includes racks 221-224 and row 230 includes racks 231-234. The racks within data center 202 are organized into rows 240, 250 and 260, wherein row 240 includes racks 241-244, row 250 includes racks 251-254 and row 260 includes racks 261-264. Finally, the racks within data center 203 are organized into rows 270, 280 and 290, wherein row 270 includes racks 271-274, row 280 includes racks 281-284 and row 290 includes racks 291-294.

Figure 3:
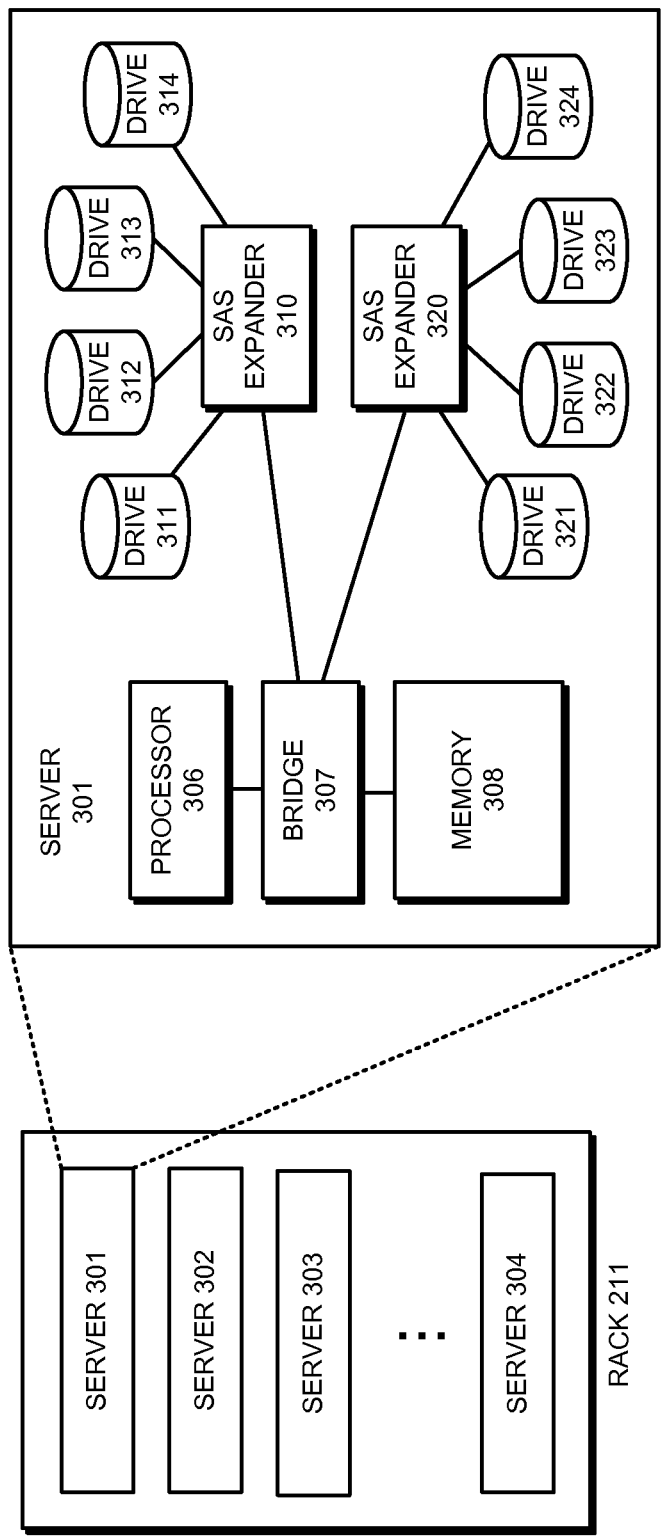
FIG. 3 illustrates a rack containing servers in accordance with the disclosed embodiments.

Each of these racks houses a number of servers. More specifically, as is illustrated in FIG. 3, rack 211 houses servers 301-304. FIG. 3 also illustrates an exemplary server 301 within rack 211, which includes a processor 306 that is connected to a memory 308 through a bridge 307. Processor 306 is also coupled to Serial Attached SCSI (SAS) expanders 310 and 320, where SAS expander 310 is coupled to disk drives 311-314 and SAS expander 320 is coupled to disk drives 321-324. (Note that SAS expanders 310 and 320 may be coupled to more or fewer disk drives.)

As illustrated in FIG. 2, data store 128 is organized hierarchically, comprising multiple data centers, wherein machines within each data center are organized into rows, wherein each row includes one or more racks, wherein each rack includes one or more servers, and wherein each server includes one or more storage devices (disk drives). To improve fault tolerance, it is desirable to distribute copies of a data item as far away as possible from each other in the hierarchy. In this way, a failure in a component of the storage system is unlikely to affect all of the copies. For example, it is desirable to distribute copies of a data item across different data centers. In this way, if a networking failure causes one of the data centers to be inaccessible, the data item can still be accessed from another data center.

However, the hierarchical structure also creates bandwidth constraints. For example, referring to FIG. 3, note that a number of disk drives 311-314 are coupled to the same SAS expander 310. Hence, bandwidth limitations through SAS expander 310 can limit the number of simultaneous data accesses that can take place to and from disk drives 311-314.

Also, bandwidth constraints generally make it easier to move data items between disk drives that are located closer to each other in the hierarchy. For example, it is easier to move data items between disk drives associated with the same server than between disk drives associated with different servers. It is also easier to move data items between disk drives located in the same rack than between disk drives located in different racks. It is similarly easier to move data items between disk drives located in the same row of racks than between disk drives located in different rows of racks. Finally, it is easier to move data items between disk drives located in the same data center than between disk drives located in different data centers.

Servers

Figures 4A, 4B:
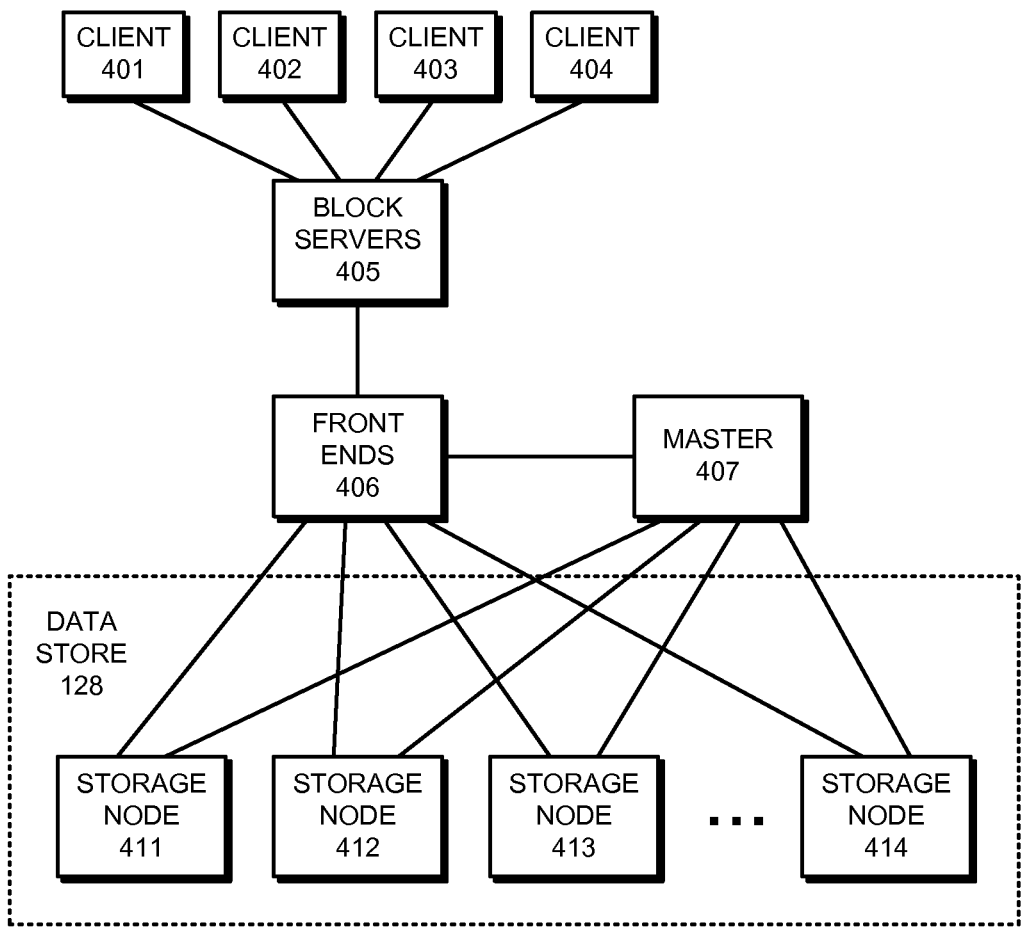
FIG. 4A illustrates various servers associated with the storage system in accordance with the disclosed embodiments.
FIG. 4B illustrates a record structure for a data block in accordance with the disclosed embodiments.

FIG. 4A illustrates various servers associated with the storage system in accordance with the disclosed embodiments. (Note that FIG. 4A hides the hierarchical structure of data store 128, and instead simply represents data store 128 as a set of storage nodes 411-414.) As illustrated in FIG. 4A, a number of client systems 401-404, which can include desktop systems or mobile devices, communicate with a collection of block servers 405 that execute application logic for the online content management system. While executing this application logic, block servers 405 make low-level storage requests to a collection of front ends 406 that service the storage requests by accessing storage nodes 411-414.

The system illustrated in FIG. 4A also includes a master controller 407 that generally monitors and maintains the health of the storage system. In doing so, master 407 keeps track of where specific copies of data items are stored, and also keeps track of which storage devices are still alive. Master 407 also determines whether it makes sense to move a copy of a data item to improve reliability and, if so, causes the move to take place.

Master 407 also determines sets of possible locations for copies of the data item and communicates this information to front ends 406. This enables front ends 406 to move copies of the new data item to the determined locations.

In some embodiments, master 407 performs the data movements during reserved time periods when no other data accesses are being performed by front ends 406. In other embodiments, master 407 operates in the background and tries not to interfere with accesses made by front ends 406. More specifically, when front ends 406 make requests to data store 128, the system tries to service these requests as quickly as possible. At the same time, in the background, master 407 performs data movements to optimize fault tolerance.

In some embodiments, master 407 is located at a single data center and coordinates data movements for copies of data items located at multiple data centers. In other embodiments, master 407 is a distributed application that has components located at each data center, wherein this distributed application coordinates data movements for all of the data centers.

Record Structure for Data Blocks

The above-described system can keep track of copies of data blocks (also referred to as "data items" or "buckets") using the data block record structure 420 illustrated in FIG. 4B. This structure includes a data block identifier (ID) 421 that identifies the data block as well as a size field 422 that indicates the size of the data block. In addition, data block record structure 420 includes three drive identifiers 423, 424 and 425 that specify the locations of copies of the data block. (For example, a location can specify (1) a data center, (2) a row within the data center, (3) a rack within the row, (4) a server within the rack, and (5) a disk drive associated with a server.) Record structure 420 can also include a generation number 426 that is used to resolve concurrency and consistency issues.

Moving Copies of Data Items

Figure 5:
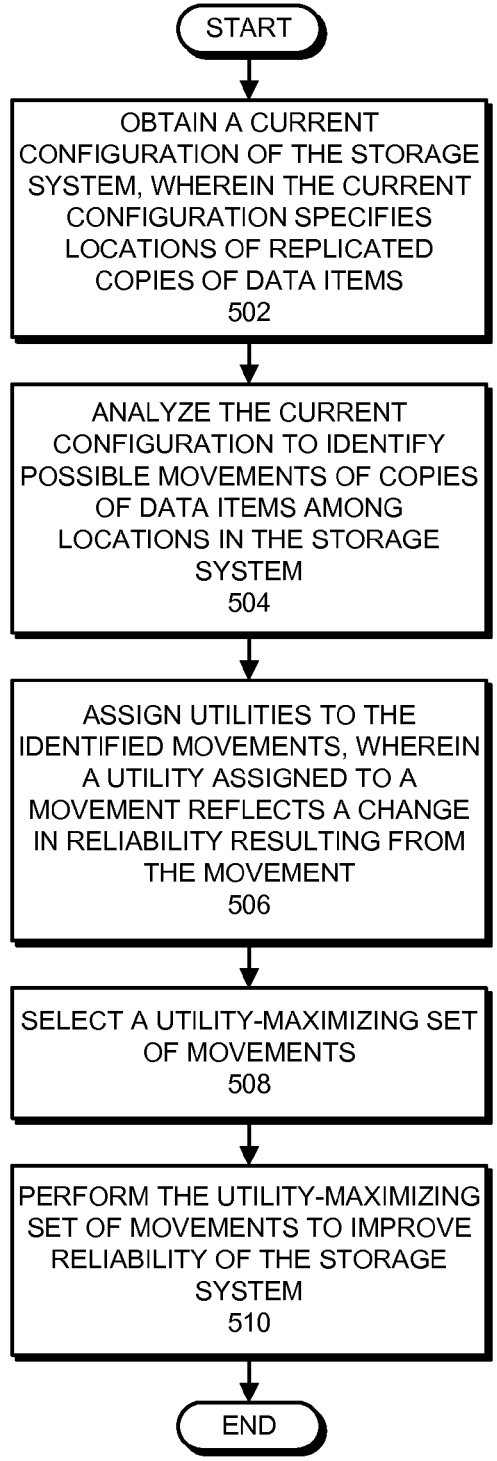
FIG. 5 presents a flow chart illustrating how copies of data items are moved within a storage system to improve fault tolerance in accordance with the disclosed embodiments.

FIG. 5 presents a flow chart illustrating how copies of data items can be moved to improve fault tolerance in accordance with the disclosed embodiments. During operation, the system obtains a current configuration for the storage system, wherein the current configuration specifies locations of replicated copies of data items (step 502). In some embodiments, the system stores three copies of each data item. However, in other embodiments the system stores more than three copies of each data item. (Note that the system can also operate with only two copies of each data item, but this provides less fault tolerance than three copies.)

In some embodiments, the system stores "archival data items," wherein these archival data items are not subsequently modified. In other embodiments, the system stores dynamic data items that can be modified. When a dynamic data item is modified, the system needs to propagate the modifications to all of the copies of the data item. Note that this can involve a significant amount of communication. The costs associated with this communication should ideally be accounted for while determining how to distribute copies of the data item. If the data item will be modified frequently, it may make more sense to locate the copies of the data item closer to each other to reduce the communication costs associated with the modifications.

Next, the system analyzes the current configuration to identify possible movements of copies of data items among locations in the storage system (step 504). This process can involve looking at where copies of data items are presently located in the storage system, and also where space is presently available to move the copies within the storage system.

The system then assigns utilities to the identified movements, wherein a utility assigned to a movement reflects a change in reliability resulting from the movement (step 506). Assigning a utility to a movement can involve computing a "utility function" for the movement, wherein the utility function indicates how the movement affects a distribution of copies of an associated data item. (Note that the copies of a data item are referred to as the "replica set" for the data item.) For example, a utility function for the distribution of a given replica set R can be calculated as follows:

$$\text{Utility}(R) = C_1(100 - 10^{(3 - \#drives)}) + C_2(\#\text{servers}) + C_3(\#\text{racks}) + C_4(\#\text{rows}) + C_5(\#\text{data centers}),$$

wherein #drives indicates how many disk drives the copies in the replica set R are distributed across. Note that if #drives is less than three, the utility of adding another drive is quite large. For example, the utility increase of going from one drive to two drives is large: $C_1(100-10^{(3-2)}) - C_1(100-10^{(3-1)}) = C_1(100-10) - C_1(100-100) = C_1 90 - C_1(0) = 90 C_1$. The utility increase of going from two drives to three drives is somewhat less: $C_1(100-10^{(3-3)}) - C_1(100-10^{(3-2)}) = C_1(100-100) = C_1(100-10) = C_1 99 - C_1 90 = 9 C_1$. Finally, the utility increase of going from three drives to four drives is even less: $C_1(100-10^{(3-4)}) - C_1(100-10^{(3-3)}) = C_1(100-0.1) - C_1(100-1) = C_1 99.9 - C_1 99 = 0.9 C_1$. Also, note that the utility increases as the copies in replica set R are distributed over more servers, more racks, more rows and more data centers. Moreover, the utility function that appears above includes a number of coefficients $C_1, C_2, C_3, C_4$ and $C_5$ that can be used to adjust the relative utilities of storing a replica set across different numbers of disk drives, servers, racks, rows and data centers, respectively.

Next, the system selects a utility-maximizing set of movements (step 508). Note that each movement changes the utility function for an associated replica set, and the system calculates the difference between the utility after the movement and the utility before the movement. The system can then sort the possible movements based on changes in utility before selecting the utility-maximizing set of movements.

In some embodiments, selecting the utility-maximizing set of movements involves considering bandwidth constraints associated with a structure of the storage system. In some cases, the system may prefer not to perform a transfer that prevents the system from performing other transfers. Hence, the system may operate under a rule that says each drive can only be involved in one transfer at a time. For example, the system may decide not to perform a single transfer from drive A to drive B, and might instead decide to perform two simultaneous transfers, from drive A to drive C and from drive B to drive D.

In some embodiments, the system monitors bandwidth constraints by constructing a graph that represents the storage system. This graph includes nodes representing: (1) data centers, (2) routers within data centers, (3) racks that are coupled to the routers, (4) servers within racks, (5) expanders coupled to servers, and (6) disk drives that are coupled to the expanders. The graph also includes edges between nodes that represent associated communication pathways. For example, a communication pathway between two servers within a rack can be represented by an edge between nodes representing the servers, and a communication pathway between two data centers through a dedicated fiber optic link can be represented by an edge that connects the two nodes representing the two data centers. While selecting a utility-maximizing set of movements, the system can overlay the candidate movements on the graph to determine whether the movements will cause bandwidth problems. Note that some of the links may be high-performance links that can accommodate more than one simultaneous data transfer. Also, there may be more than one possible path between two nodes in the graph. In this case, the system can consider an alternative pathway if a given pathway is already saturated.

In other embodiments, the bandwidth limitations are not represented as constraints but are instead represented as cost parameters in an objective function, wherein the objective function also takes into account the increase in utility for data movements. In these embodiments, the system uses an optimization technique, such as a hill-climbing or simulated annealing to optimize the objective function.

Finally, the system performs the utility-maximizing set of movements to improve the reliability of the storage system (step 510). In some embodiments, the utility-maximizing set of movements are all performed at the same time while other data accesses are temporarily suspended. In other embodiments, the utility-maximizing set of movements are performed opportunistically in the background during idle periods between other higher-priority data accesses.

Storing Copies of New Data Items

Figure 6:
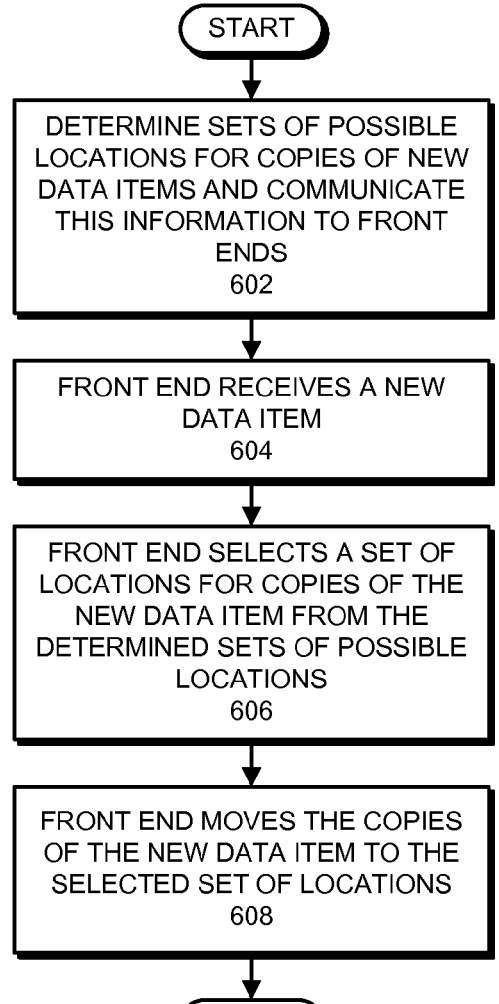
FIG. 6 presents a flow chart illustrating how copies of a new data item are stored at selected locations in a storage system in accordance with the disclosed embodiments.

FIG. 6 presents a flow chart illustrating how copies of a new data item are stored at selected locations in the storage system in accordance with the disclosed embodiments. As mentioned above with reference to FIG. 4, a master controller 407 determines sets of possible locations for copies of new data items. More specifically, while periodically analyzing the current configuration, master 407 also determines sets of possible locations for copies of new data items and communicates this information to front ends 406 (step 602). At a later time, one of the front ends 406 receives a new data item (step 604). In response, the front end selects a set of locations for copies of the new data item from the determined sets of possible locations (step 606). The front end then moves copies of the new data item to the selected set of locations (step 608).

RAID Techniques

Instead of replicating data items, some embodiments use redundant-array-of-independent-disks (RAID) techniques or techniques based on error-correcting code to provide fault tolerance. These techniques generally operate by using a small amount of additional storage to store parity bits or error-correcting code (ECC) syndromes to provide fault tolerance, without having to incur the cost of storing multiple copies of data items. For example, in a system that supports RAID Level 5, the system can store 12 blocks of data along with 4 blocks of parity information across 4 disk drives. If the blocks are distributed across the 4 disk drives appropriately, the system can use the parity information to recover from a failure of any one of the four disk drives.

In order to use a RAID-based technique to store a data item, the system can divide the data item into three blocks, and the system can create an additional block containing parity information. The system can then distribute the three data blocks and the parity block across four drives using a utility function that is similar to the utility function discussed above.

Note that in some situations using a RAID-based technique can increase bandwidth requirements and computational requirements. For example, if a drive fails and one out of the four blocks described above is unrecoverable, the unrecoverable block needs to be reconstructed from the remaining three blocks. This reconstruction process requires the remaining blocks to be retrieved from their drives to reconstruct the unrecoverable block. This retrieval and reconstruction process can be time-consuming and can consume a considerable amount of bandwidth and computational time.

Further Extensions

In addition to improving fault tolerance, the data movements can also be directed to optimizing other system characteristics. For example, the data movements can also be made to balance the distribution of data between disk drives. Note that if the system writes data randomly to the disk drives, one drive may become overly full. In this case, it is desirable to move copies of data items from the overly full drive to other drives. However, note that this type of data movement is typically less important than other storage system operations, such as an operation to replace a copy of a data item that was lost when a drive failed.

In addition to considering bandwidth constraints while selecting a set of movements, the system can also consider the additional computational load associated with the data movements. For example, the system can assign a computational cost to a move, wherein the computational cost factors in a computational load on a source CPU that is associated with a source drive for the move, and also a computational load on a destination CPU that is associated with a destination drive for the move.

The data movements can also attempt to balance computational load between servers. For example, the system can obtain utility from moving data off a highly loaded server to a more lightly loaded server, so we might choose a move that provides this load-distribution utility in addition to the data-distribution utility that is gained from moving copies of data items farther apart.

There is also a tradeoff between the bandwidth dedicated to moving copies of data items to improve fault tolerance and bandwidth dedicated to simply accessing the data items. Generally, the process of moving copies of data items to improve fault tolerance is less important than other data accesses. Hence, in some embodiments, background processes are used to move copies of data items to improve fault tolerance, wherein these background processes can be preempted by normal processes that perform other types of data accesses.

In other embodiments, a fixed amount of the storage system's bandwidth, for example 10% of the available bandwidth, can be dedicated to moving copies of data items for fault tolerance purposes, and the remaining 90% can be dedicated to normal data accesses. Moreover, note that it is possible to adjust this fixed percentage if necessary. For example, the percentage of available bandwidth dedicated to moving copies of data items can be increased in situations where there is important data-distribution work to be done. For example, if a server fails, copies of data items that were stored on the server should be replicated and stored on other servers as soon as possible. In this case, it may make sense to temporarily increase the percentage of available bandwidth that is dedicated to moving copies of data items from 10% to 30%.

The size of the data items that are replicated can also vary considerably. In some embodiments, smaller blocks of data can be replicated. For example, the system can be configured to replicate blocks of data that are only a few megabytes (or even kilobytes) in size. In other embodiments, the system replicates larger blocks of data. For example, the system can replicate blocks of data that are one or more gigabytes in size.

There is also a tradeoff between different block sizes for the data items. Managing larger data blocks makes bookkeeping easier because there are fewer blocks to keep track of. However, using smaller block sizes makes it easier to distribute data uniformly across disk drives. Also, copies of smaller blocks require less time to transfer, and this reduces the number of long data transfers that tend to create congestion on data paths.

While selecting a set of movements, the system can also take into account how the data is likely to be accessed and, more specifically, from which locations a specific data item is likely to be accessed. For example, if a data item is likely to be accessed by a data-mining application that runs on a specific machine at a specific data center, it may make sense to locate a copy of the data item within the same data center, or better yet within the same set of servers that are running the data-mining application. This can improve the performance of the data-mining application and can also reduce bandwidth on associated communication links.

In some embodiments, the data items are not replicated, and data movements are not focused on improving fault tolerance by distributing multiple copies of data items. The system instead moves single instances of data items for other purposes, such as: moving data items closer to servers that will be accessing the data items; distributing system load between servers; and distributing data more evenly between disk drives.

Note that the data movements can take place at regularly scheduled time periods that are dedicated to system maintenance, wherein other data accessed not allowed. These regularly scheduled time periods may take place frequently, for example every hour, or may take place less frequently, for example once a week during time periods dedicated to regular system maintenance. Alternatively, the data movements can take place in the background during idle time periods, when associated servers, data paths and disk drives are not busy performing other higher-priority tasks.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A computer-implemented method for managing replicated copies of data items in a storage system, the method comprising:
    obtaining a current configuration of the storage system, wherein the current configuration specifies locations of replicated copies of data items;
    analyzing the current configuration to identify possible movements of copies of data items among locations in the storage system;
    assigning utilities to the identified movements, wherein a utility assigned to a movement reflects a change in reliability resulting from the movement, wherein assigning the utility to the movement involves computing a utility function for the movement;
    selecting a utility-maximizing set of movements; and
    performing the utility-maximizing set of movements to improve reliability of the storage system:
    wherein the utility function includes:
        a distribution component indicating how the movement affects a distribution of copies of a data item in the storage system; and
        a replication component indicating how the movement affects a desired number of copies of the data item in the storage system.

2. The computer-implemented method of claim 1, wherein assigning a utility to a movement involves assigning a higher utility to a movement that causes replicated copies of a data item to be distributed farther apart in a hierarchical structure of the storage system.

3. The computer-implemented method of claim 1,
    wherein a movement of a data item can also involve making a copy of the data item; and
    wherein assigning a utility to a movement that also makes a copy of a data item involves assigning a higher utility if there exists fewer than a desired number of copies of the data item in the storage system.

4. The computer-implemented method of claim 1, wherein selecting a utility-maximizing set of movements involves considering bandwidth constraints associated with a structure of the storage system while selecting the set of movements.

5. The computer-implemented method of claim 1,
    wherein analyzing the current configuration also involves determining sets of possible locations for copies of new data items; and
    wherein the method further comprises,
        receiving a new data item at the storage system;
        selecting a set of locations for copies of the new data item from the determined sets of possible locations; and
        moving the copies of the new data item to the selected set of locations.

6. The computer-implemented method of claim 1,
    wherein the storage system has a hierarchical structure comprising one or more data centers;
    wherein machines within each data center are organized into rows;
    wherein each row includes one or more racks;
    wherein each rack includes one or more servers; and
    wherein each server includes one or more storage devices.

7. The computer-implemented method of claim 1, further comprising continually repeating the method during operation of the storage system.

8. A non-transitory computer-readable storage medium storing instructions that when executed by a computer cause the computer to perform a method for managing replicated copies of data items in a storage system, the method comprising:
    obtaining a current configuration of the storage system, wherein the current configuration specifies locations of replicated copies of data items;
    analyzing the current configuration to identify possible movements of copies of data items among locations in the storage system;
    assigning utilities to the identified movements, wherein a utility assigned to a movement reflects a change in reliability resulting from the movement, wherein assigning the utility to the movement involves computing a utility function for the movement;
    selecting a utility-maximizing set of movements; and
    performing the utility-maximizing set of movements to improve reliability of the storage system:,
    wherein the utility function includes:
        a distribution component indicating how the movement affects a distribution of copies of a data item in the storage system; and
        a replication component indicating how the movement affects a desired number of copies of the data item in the storage system.

9. The non-transitory computer-readable storage medium of claim 8, wherein assigning a utility to a movement involves assigning a higher utility to a movement that causes replicated copies of a data item to be distributed farther apart in a hierarchical structure of the storage system.

10. The non-transitory computer-readable storage medium of claim 8,
    wherein a movement of a data item can also involve making a copy of the data item; and
    wherein assigning a utility to a movement that also makes a copy of a data item involves assigning a higher utility if there exists fewer than a desired number of copies of the data item in the storage system.

11. The non-transitory computer-readable storage medium of claim 8, wherein selecting a utility-maximizing set of movements involves considering bandwidth constraints associated with a structure of the storage system while selecting the set of movements.

12. The non-transitory computer-readable storage medium of claim 8,
    wherein analyzing the current configuration also involves determining sets of possible locations for copies of new data items; and
    wherein the method further comprises,
        receiving a new data item at the storage system;
        selecting a set of locations for copies of the new data item from the determined sets of possible locations; and
        moving the copies of the new data item to the selected set of locations.

13. A system that manages replicated copies of data items, comprising:
    a storage system configured to store replicated copies of data items, wherein the storage system is organized hierarchically and includes a plurality of storage devices; and
    a controller for the storage system wherein the controller is configured to,
        obtain a current configuration of the storage system, wherein the current configuration specifies locations of replicated copies of data items;
        analyze the current configuration to identify possible movements of copies of data items among locations in the storage system;
        assign utilities to the identified movements, wherein a utility assigned to a movement reflects a change in reliability resulting from the movement, wherein assigning the utility to the movement involves computing a utility function for the movement;
        select a utility-maximizing set of movements; and
        perform the utility-maximizing set of movements to improve reliability of the storage system:,
    wherein the utility function includes:
        a distribution component indicating how the movement affects a distribution of copies of a data item in the storage system; and
        a replication component indicating how the movement affects a desired number of copies of the data item in the storage system.

14. The system of claim 13, wherein while assigning a utility to a movement, the controller is configured to assign a higher utility to a movement that causes replicated copies of a data item to be distributed farther apart in a hierarchical structure of the storage system.

15. The system of claim 13,
    wherein a movement of a data item can also involve making a copy of the data item; and
    wherein while assigning a utility to a movement that also makes a copy of a data item, the controller is configured to assign a higher utility if there exists fewer than a desired number of copies of the data item in the storage system.

16. The system of claim 13, wherein while selecting the utility-maximizing set of movements, the controller is configured to consider bandwidth constraints associated with a structure of the storage system.

17. The system of claim 13,
    wherein the controller is configured to determine sets of possible locations for copies of new data items; and
    wherein when the storage system receives a new data item, the controller is configured to,
        select a set of locations for copies of the new data item from the determined sets of possible locations; and
        move the copies of the new data item to the selected set of locations.

18. A computer-implemented method for managing replicated copies of data items in a storage system, the method comprising:
    obtaining a current configuration of the storage system, wherein the current configuration specifies locations of replicated copies of data items;
    analyzing the current configuration to identify possible movements of copies of data items among locations in the storage system;
    assigning utilities to the identified movements, wherein a utility assigned to a movement reflects a change in reliability resulting from the movement;
    selecting a utility-maximizing set of movements; and
    performing the utility-maximizing set of movements to improve reliability of the storage system;
    wherein analyzing the current configuration also involves determining sets of possible locations for copies of new data items; and
    wherein the method further comprises,
        receiving a new data item at the storage system;
        selecting a set of locations for copies of the new data item from the determined sets of possible locations; and moving the copies of the new data item to the selected set of locations.

19. The computer-implemented method of claim 18, wherein assigning a utility to a movement involves assigning a higher utility to a movement that causes replicated copies of a data item to be distributed farther apart in a hierarchical structure of the storage system.

20. The computer-implemented method of claim 18,
    wherein a movement of a data item can also involve making a copy of the data item; and
    wherein assigning a utility to a movement that also makes a copy of a data item involves assigning a higher utility if there exists fewer than a desired number of copies of the data item in the storage system.

21. The computer-implemented method of claim 18, wherein assigning a utility to a movement involves computing a utility function for the movement, wherein the utility function includes:
    a distribution component indicating how the movement affects a distribution of copies of a data item in the storage system; and
    a replication component indicating how the movement affects a desired number of copies of the data item in the storage system.

* * * * *